(12) United States Patent
Boyle et al.

(10) Patent No.: US 8,565,737 B1
(45) Date of Patent: Oct. 22, 2013

(54) MOBILE VOICE CALLS TO MOBILE TERMINATED DATA

(75) Inventors: Stephen S. Boyle, Lincoln, CA (US); John D. Finney, Incline Village, NV (US); Russell S. Greer, Los Gatos, CA (US)

(73) Assignee: Joingo LLC, San Jose, CA (US)

( * ) Notice: Subject to any disclaimer, the term of this patent is extended or adjusted under 35 U.S.C. 154(b) by 58 days.

(21) Appl. No.: 13/237,904

(22) Filed: Sep. 20, 2011

Related U.S. Application Data

(60) Provisional application No. 61/384,836, filed on Sep. 21, 2010.

(51) Int. Cl.
- H04M 3/42 (2006.01)
- H04W 4/00 (2009.01)
- G06Q 30/00 (2012.01)

(52) U.S. Cl.
USPC .............. 455/414.1; 455/415; 455/435.1; 455/466; 705/14.4; 705/14.49; 705/14.55; 705/14.56

(58) Field of Classification Search
USPC ........ 455/414.1, 415, 435.1; 705/14.4, 14.49, 705/14.55–14.56
See application file for complete search history.

(56) References Cited

U.S. PATENT DOCUMENTS

| | | | |
|---|---|---|---|
| 7,920,850 B1 | 4/2011 | Harris et al. | |
| 8,315,178 B2 * | 11/2012 | Makhoul et al. | 370/252 |
| 2002/0028672 A1 * | 3/2002 | Qi et al. | 455/414 |
| 2002/0119793 A1 * | 8/2002 | Hronek et al. | 455/466 |
| 2004/0171380 A1 | 9/2004 | Puranik et al. | |
| 2006/0258399 A1 | 11/2006 | Liebowitz et al. | |
| 2007/0073808 A1 | 3/2007 | Berrey et al. | |
| 2007/0136789 A1 | 6/2007 | Fotta et al. | |
| 2008/0261635 A1 * | 10/2008 | Samiri et al. | 455/466 |
| 2008/0287095 A1 | 11/2008 | Pousti | |
| 2010/0041380 A1 * | 2/2010 | Hewes et al. | 455/414.4 |
| 2010/0121709 A1 | 5/2010 | Berezin et al. | |
| 2010/0124937 A1 | 5/2010 | Vogel et al. | |
| 2011/0158222 A1 * | 6/2011 | Kerr et al. | 370/352 |

FOREIGN PATENT DOCUMENTS

WO WO2010018472 2/2010

* cited by examiner

*Primary Examiner* — Jean Gelin
*Assistant Examiner* — Dung Hong
(74) *Attorney, Agent, or Firm* — Clause Eight IPS; Michael Catania

(57) ABSTRACT

A method and system for an end user (caller) to easily opt-in to receive digital communications, such as for a mobile marketing campaign, is disclosed herein. A caller uses a mobile communication device to make a standard voice phone call to a predefined number. A voice call termination point captures the caller ID. The caller then makes a selection, and the call is terminated. If the caller is determined to be using a mobile communication device, a confirmation of the selection is sent to the mobile communication device.

16 Claims, 8 Drawing Sheets

MOBILE VOICE CALLS TO MOBILE TERMINATED DATA

CROSS REFERENCE TO RELATED APPLICATION

The Present Application claims priority to U.S. Provisional Patent Application No. 61/384,836, filed on Sep. 21, 2010, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to wireless communications. More specifically, the present invention relates to a method and system for opting in to a mobile marketing campaign.

2. Description of the Related Art

The use of mobile phones, handsets and other wireless devises is becoming a primary means for individuals to stay connected in their personal and professional lives. Mobile handsets and other wireless devised are being targeted by businesses to aid in their marketing efforts, delivering specific content directly to prospective customers. The challenge in any mobile marketing campaign is getting individuals to perform a mobile opt-in that is compliant with the Mobile Marketing Association ("MMA") guidelines for mobile advertising which requires that mobile communication device users opt-in to receive digital communications related to a mobile marketing campaign. Mobile Marketing as defined by the MMA is "a set of practices that enables organizations to communicate and engage with their audience in an interactive and relevant manner through any mobile device or network." The MMA guidelines require the individual to initiate the opt-in sequence from the device where marketing messages will be delivered. This is normally accomplished by enticing the end user to text a code to a service shortcode or phone number. Alternately, the process can be initiated by having the individual enter their mobile phone number on a web site and then sending a message to that phone number asking them to confirm a desire to receive marketing messages. The problem with both of these methods is complexity and number of steps.

The prior art discusses various technologies related to companies communicating with personal mobile communication devices.

Vogel et al., U.S. Patent Publication Number 2010/0124937 for a Method Of Customer Relationship Management Using A Short Range Communications Network discloses a customer subscribing to a service from a business entity and receiving communications when the customer's BLUETOOTH device is detected within a certain range.

Harris et al, U.S. Pat. No. 7,920,850 for a Method And System For A Hospitality Entity To Communicate Goods And Services To A Guest discloses a customer opt-in in to a service from a business entity to receive discounts on goods and services from the business entity.

Puranik et al, U.S. Patent Publication Number 2004/171380 for Opt-In Pinging And Tracking For GPS Mobile Telephones discloses a method and system for a user to opt-in to being tracked through the GPS device of the user's mobile phone.

Berrey et al., U.S. Patent Publication Number 2007/0073808 for a Mobile Messaging System discloses delivering messages directly to a client from an enterprise regardless of the client's communication provider.

Pousti, U.S. Patent Publication Number 2008/0287095 for Systems And Methods For Generation, Registration And Mobile Phone Billing Of A Network-Enabled Application With One-Time Opt-In discloses one time opt-in for pre-authorization of charges to a mobile phone account for videos and songs.

Berezin et al., U.S. Patent Publication Number 2010/0121709 for an Invitation-Based Viral Advertising discloses opt-in form for viral distribution of advertising.

Liebowitz et al, U.S. Patent Publication Number 2006/0258399 for Interactive Opt-In Messaging discloses a method and system for a user to opt-in for receiving messages to the user's mobile phone wherein the user calls a number for a solicitation in the message.

Fotta et al., U.S. Patent Publication Number 2007/0136789 for a System And Method For Integrated Compliance And Contact Management discloses opt-in for one or more communication contact types based on a set of mediation rules.

Talisma Corporation, PCT Publication Number WO2010018472, for A Method To Drive A Campaign Workflow Based On A Short Message Service Message Response discloses generating and sending appropriate messages based on users responses to a marketing campaign.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

It is sufficiently difficult enough for an enterprise to motivate end-users to participate in a mobile marketing campaign. The complexity of the current opt-in processes further discourages users and reduces the number of participants in mobile marketing campaigns. What is needed is a simple and easy process to allow end-users (e.g. mobile marketing campaign participants) to opt-in to receive digital communications from an enterprise.

BRIEF SUMMARY OF THE INVENTION

The present invention provides a simple and easy solution needed to motivate (or at least not discourage) end-users to opt-in to receive digital communications from an enterprise.

The present invention enables MMA compliant opt-in to a data service by simply dialing a ten digit phone number, thus reducing complexity for the end user and steps in the opt-in process. An end user uses a mobile handset to place a standard voice phone call to a predefined number which can be advertised by an enterprise as the starting point for a data service subscription. A voice call termination point then captures the caller ID of the mobile originated call. If the system determines that the caller is using a mobile handset, the system then sends the response to the opt-in selection. The response sent from the system is typically a welcome message sent as a SMS message. In much the same way, the system can accommodate a termination of service (opt out), or requests for information in the form of data services, by the end user calling the same ten digit telephone number.

One aspect of the present invention is a method for a user to opt-in to receive digital communications. The method includes receiving a telephone call to a pre-designated telephone number from a telephone number of a user. The method also includes collecting the caller identification of the telephone number of the user at a voice call termination point. The method also includes determining a type and a phone carrier of the telephone number of the user. The method also includes screening the telephone number of the user for association with a data capable phone carrier and communication device. The method also includes determining that the telephone number of the user is associated with a data capable phone carrier and communication device. The method also includes transmitting a confirmation digital communication from a voice opt service site to the data capable communication device associated with the telephone number of the user.

Optionally the method includes receiving a valid selection from the telephone number of the user and terminating the telephone call at a voice termination point.

Optionally, the method further includes requesting and receiving from a mobile communication carrier at least one of: (1) if the mobile communication device is activated (on); (2) what is the type of mobile communication device; (3) does the end user (e.g., owner) have an SMS plan associated with the mobile communication device; and (4) does the end user have a data plan associated with the mobile communication device. The method could include requesting and receiving all of the above mentioned factors. The method further includes transmitting to the mobile communication device appropriate content based on at least one of the carrier, the type of mobile communication device, the SMS plan associated with the mobile communication device, and the structure of the data plan associated with the mobile communication device. The method could transmit content based on all or some of the above factors.

The digital communication of the method is preferably a SMS communication to confirm participation in a mobile marketing campaign. Alternatively, the digital communication of the method is a MMS communication or a content push such as WAP push.

The data capable communication device of the method is preferably a mobile phone such as a smartphone. Alternatively, the data capable communication device is a tablet computer.

Another aspect of the present invention is a method for a mobile marketing association compliant opt-in to a mobile marketing campaign. The method includes receiving a telephone call to a pre-designated telephone number from a telephone number of a user. The method also includes transferring the telephone call from the mobile communication device to a mobile communication service provider. The method also includes transferring the telephone call from the mobile communication service provider to a public network. The method also includes transferring the telephone call from the public network to a voice call termination point. The method also includes collecting the caller identification of the mobile communication device at the voice call termination point. The method also includes confirming that an opt-in option has been selected. The method also includes storing the caller identification of the mobile communication device at a voice opt service site. The method also includes requesting a carrier type and information for the mobile communication device from a SMS gateway. The method also includes receiving the carrier type and information for the mobile communication device from the SMS gateway at the voice opt service site. The method also includes confirming at the voice opt service site that the call is from a mobile communication device. The method also includes transmitting an opt-in confirmation message from the voice opt service site to the mobile service provider. The method also includes transmitting the opt-in confirmation message from the mobile service provider to the mobile communication device.

Those skilled in the pertinent art will recognize that although the method of the present invention includes numerous steps, the end user (caller or mobile marketing campaign participant) only has to call a ten digit telephone number and make a single selection, and then the telephone call ends thereby requiring little time from the end user while the "telephone call" is further processed to make the end user's selection and to transmit a confirmation to the end user, which is all accomplished without the need for the end user to remain on the telephone call.

Yet another aspect of the present invention is a system for a user to opt-in to receive digital communications. The system includes a communication network, multiple mobile communication devices, and a voice opt service site. Each of the multiple mobile communication devices is capable of accessing the communication network. The voice opt service site is in communication with at least one of the mobile communication devices over the communication network. The voice opt service site is configured to: receive a telephone call to a pre-designated telephone number from a telephone number of a user; to collect the caller identification of the telephone number of the user; to determine a type and a phone carrier of the telephone number of the user; to screen the telephone number of the user for association with a data capable phone carrier and communication device; to determine that the telephone number of the user is associated with a data capable phone carrier and communication device; and to transmit a confirmation digital communication from a voice opt service site to the data capable communication device associated with the telephone number of the user.

Optionally, the voice opt service site is configured to request and receive from a mobile communication carrier: (1) if the mobile communication device is activated (on); (2) what is the type of mobile communication device; (3) does the end user (e.g., owner) have an SMS plan associated with the mobile communication device; and (4) does the end user have a data plan associated with the mobile communication device. The voice opt service site is further configured to transmit to the mobile communication device appropriate content based on at least one of the carrier, the type of mobile communication device, the SMS plan associated with the mobile communication device, and the structure of the data plan associated with the mobile communication device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
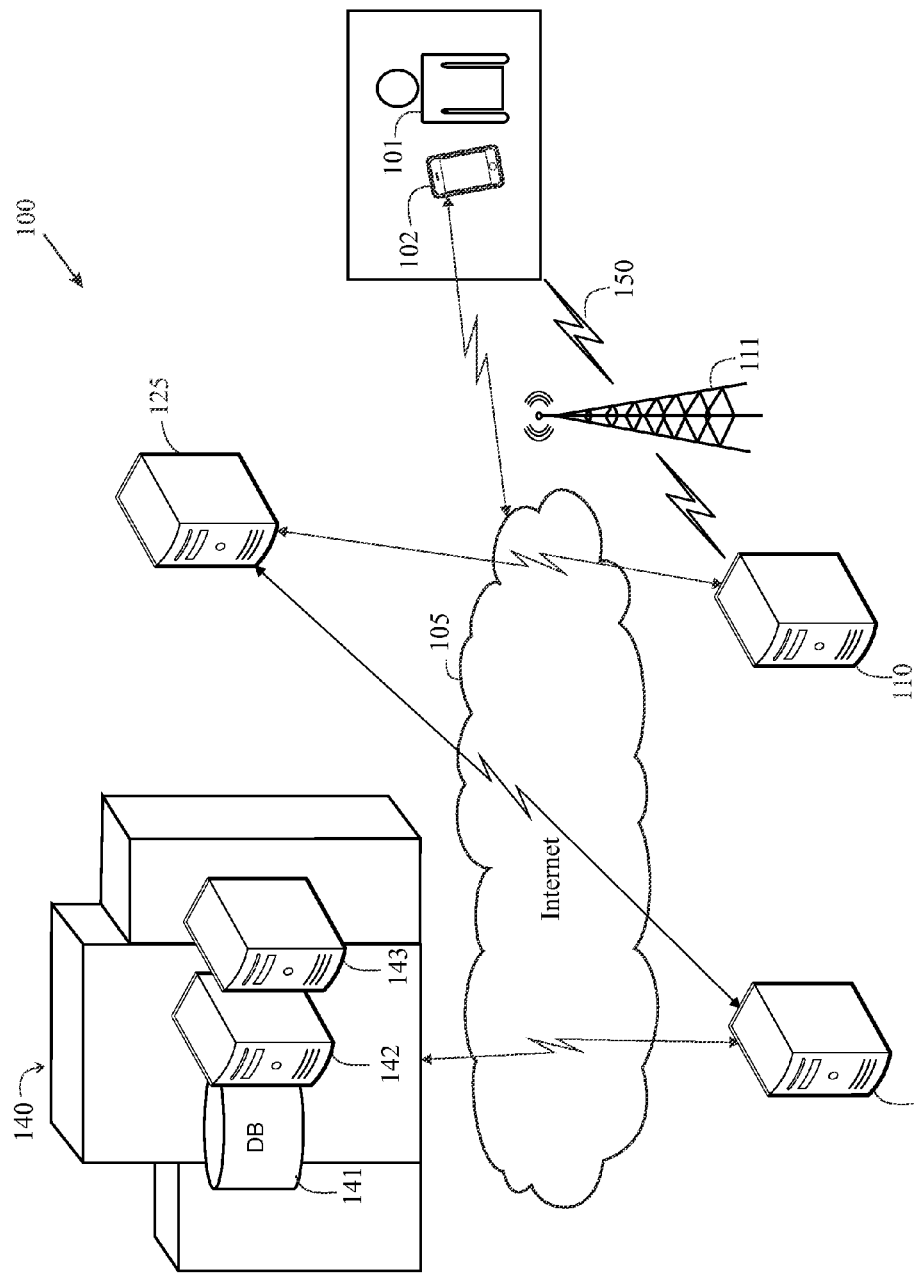
FIG. 1 is a block diagram of a system for mobile voice calls to mobile terminated data.

FIG. 1 is a block diagram of a system 100 for mobile voice calls to mobile terminated data. The system 100 allows an end user 101 to easily opt-in (or make other selections) to receive digital communications from an enterprise over a mobile communication network with a mobile communication device 102 such as mobile phone. The system 100 preferably includes a mobile communication service provider 110 with antennas 111 for transmissions over a mobile communication network 150, and a voice opt service site 120 which communicates with the mobile communication service provider 110 over the Internet 105. The system 100 most preferably also includes an enterprise site 140 and a SMS aggregator 125, also communicating over the Internet 105. The enterprise site 140 preferably includes a database 141, a server 142 and a website 143. The enterprise site 140 preferably communicates with the voice opt service site 120 over the Internet 105 for a mobile marketing campaign. The voice opt service site 120 preferably communicates with a SMS aggregator 125 over the Internet 105 and the SMS aggregator 125 preferably communicates with the mobile communication service provider 110 over the Internet 105. The end user 101 can use the mobile communication device 102 to access the Internet 105 using WiFi or the like, in addition to using the mobile communication network 150. As set forth below, the end user 101 places a call to a ten digit telephone number and preferably makes a single selection in order to opt in to receive digital communications from the enterprise site 140. Once the selection is made, the telephone call is terminated the telephone all is process or selection is processed without having the end user wait on the call. The end user 101 receives a confirmation message at a later time sent to the mobile communication device 102.

An enterprise can be any type of organization that desires to conduct a mobile marketing campaign or similar mobile marketing to end usrs. The enterprise can be a business like Exxon, Apple, Nordstrom or the like. The enterprise can be a non-profit or charity like the American Red Cross. The enterprise can be a government agency like FEMA. The enterprise can be a political party. The enterprise can be an organization like the American Medical Association. Those skilled in the pertinent art will recognize other types of enterprises that can use the present invention.

Figure 2:
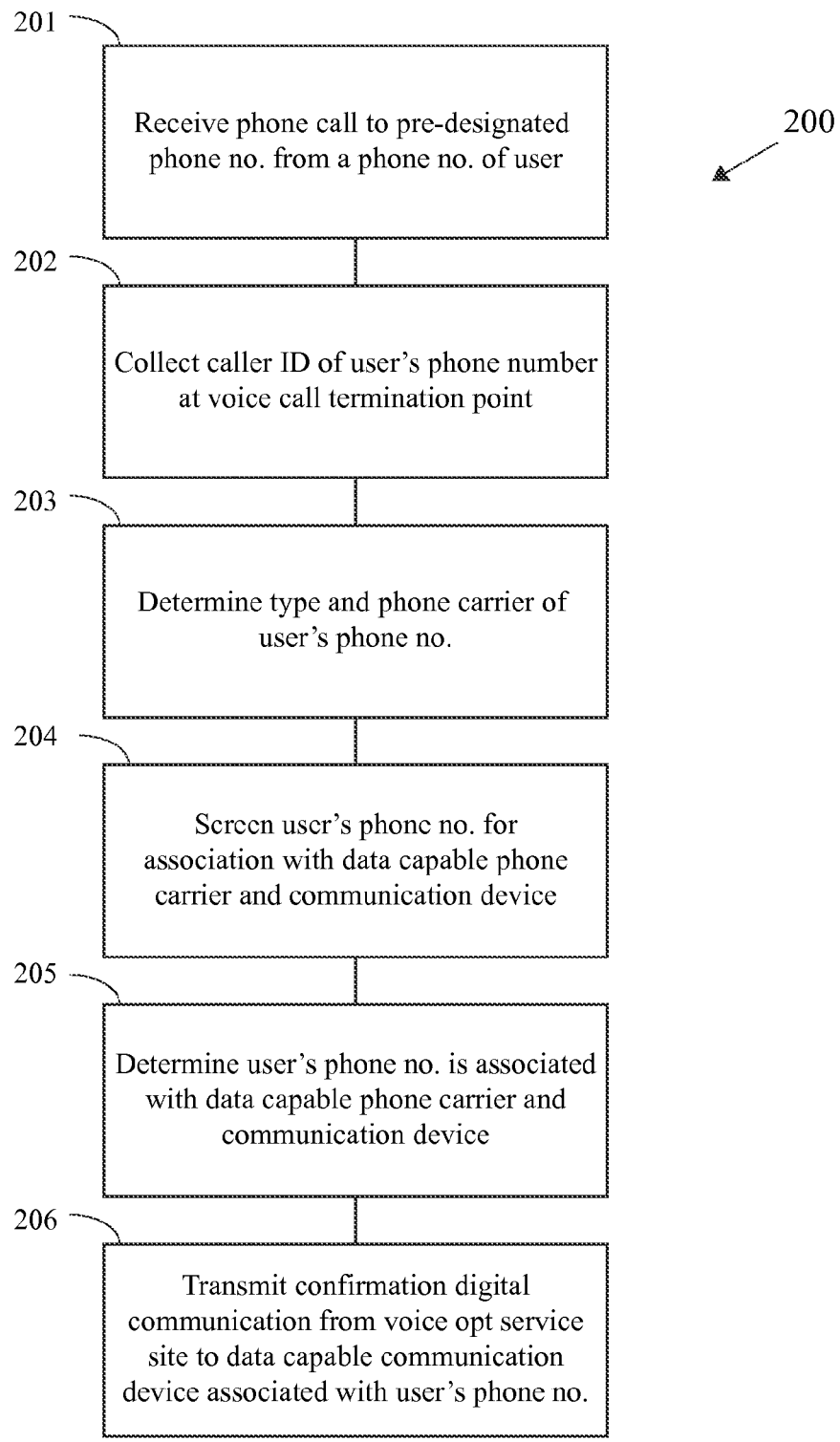
FIG. 2 is a flow chart of a general method for mobile voice calls to mobile terminated data.

FIG. 2 is a flow chart of a general method 200 for mobile voice calls to mobile terminated data. At block 201, a telephone call to a pre-designated telephone number is received from a telephone number of an end user. At block 202, the caller identification of the telephone number of the end user is collected at a voice call termination point. At block 203, a type and a phone carrier of the telephone number of the end user is determined at a voice opt service site. At block 204, the telephone number of the end user is screened for association with a data capable phone carrier and communication device. At block 205, the telephone number of the end user is determined to be associated with a data capable phone carrier and communication device. At block 206, a confirmation digital communication from a voice opt service site is transmitted to the data capable communication device associated with the telephone number of the end user.

Figure 3:
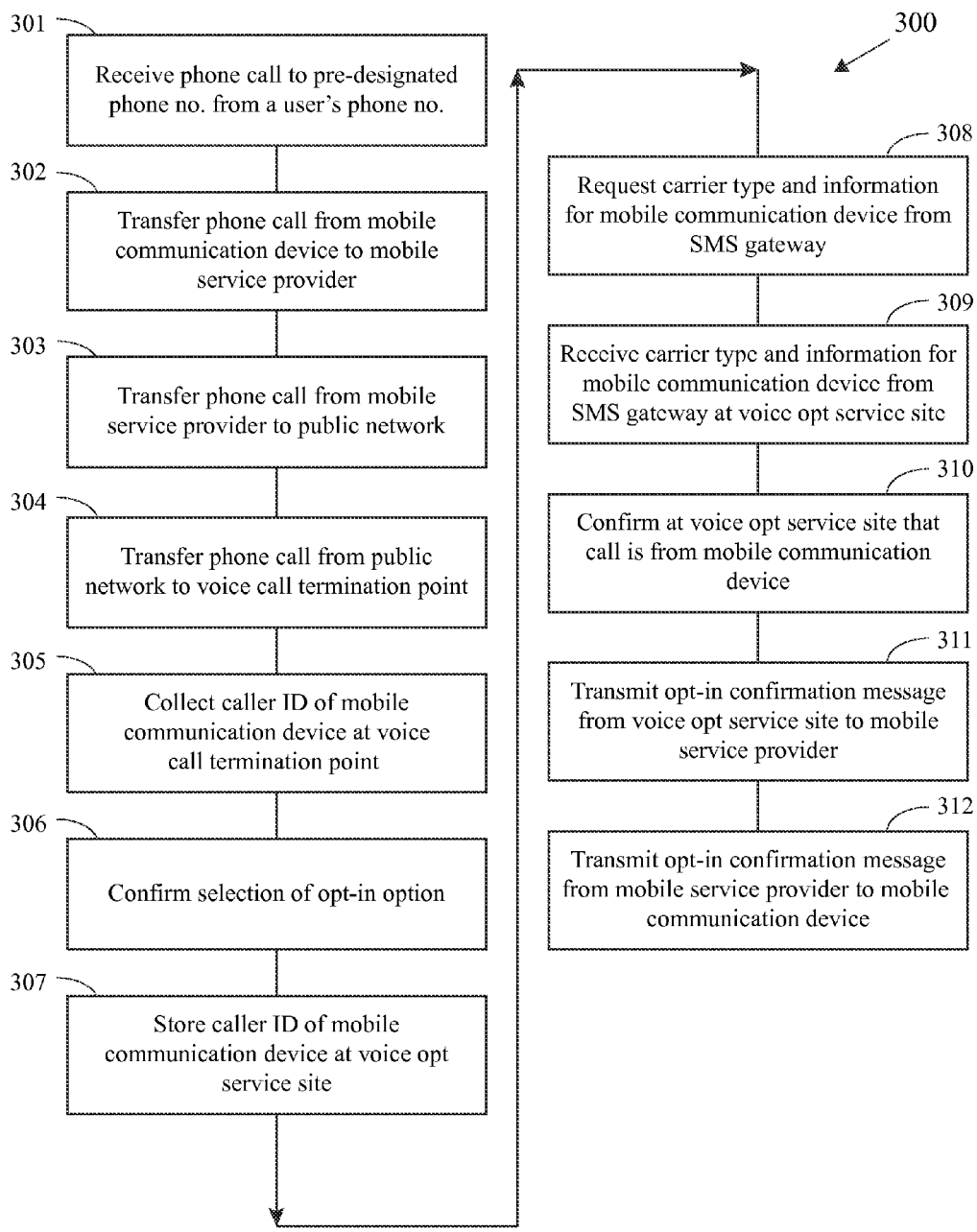
FIG. 3 is a flow chart of a specific method for mobile voice calls to mobile terminated data.

FIG. 3 is a flow chart of a specific method 300 for mobile voice calls to mobile terminated data. At block 301, a telephone call to a pre-designated telephone number is received from a telephone number of an end user. At block 302, the telephone call is transferred from a mobile communication device to a mobile communication service provider. At block 303, the telephone call is transferred from the mobile communication service provider to a public network. At block 304, the telephone call is transferred from the public network to a voice call termination point. At block 305, the caller identification of the mobile communication device is collected at the voice call termination point. At block 306, a selection of an opt-in option is confirmed. At block 307, the caller identification of the mobile communication device is stored at a voice opt service site. At block 308, a carrier type and information for the mobile communication device is requested from a SMS gateway. At block 309, the carrier type and information for the mobile communication device is received from the SMS gateway at the voice opt service site. At block 310, the voice opt service site confirms that the call is from a mobile communication device. At block 311, an opt-in confirmation message is transmitted from the voice opt service site to the mobile service provider. At block 312, the opt-in confirmation message is transmitted from the mobile service provider to the mobile communication device.

Mobile communication devices utilized with the present invention can include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server for the voice opt service site is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the server is preferably HTTP.

The server preferably transmits a delivery SMS message to a mobile communication device with a confirmation of an opt-in selection. Preferably, the SMS message is sent using standard SMS protocols used by wireless carriers. Alternatively, an application message is transmitted to the server using normal data protocols such as TCP/IP.

The voice opt service site preferably sends a request for phone number registry information to a mobile communication service provider (aka phone carrier) of the end user such as VERIZON, AT&T, SPRINT, T-MOBILE, and the like mobile communication service providers, in order to determine what type of mobile communication device is used by the end user. The mobile communication service provider sends the phone number registry information (the type of phone) to the voice opt service site.

Figure 4:
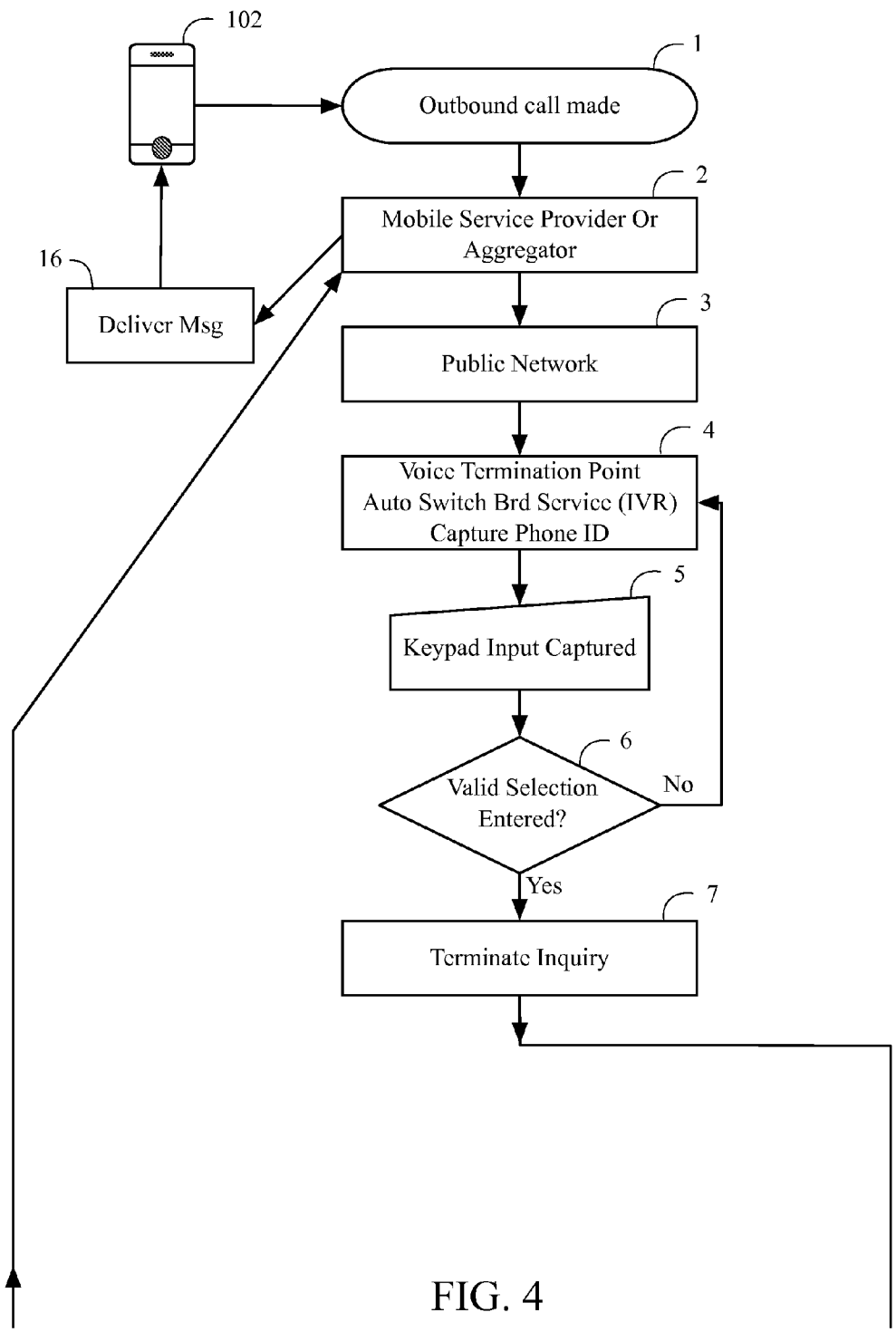
FIG. 4 is a flow chart of a specific method for mobile voice calls to mobile terminated data.
Figure 4:
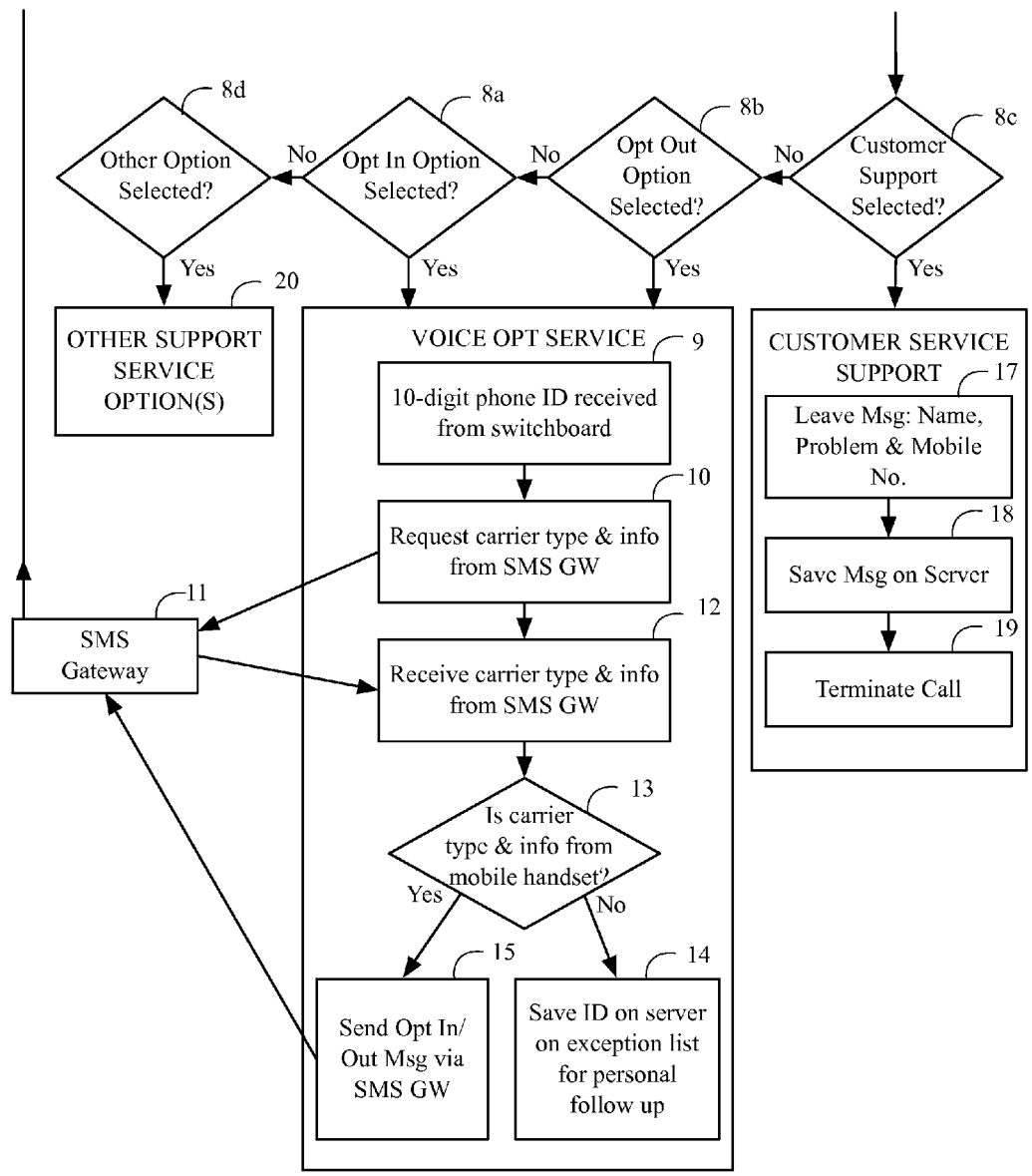

A flow chart for a specific method of the present invention is shown in FIG. 4. A call is made from a mobile communication device 102 to a pre-designated number at block 1. A call made from a mobile communication device is routed through a mobile communication network (mobile service provider or aggregator) at block 2 and then to a public network at block 3. If the call is made from a device other than a mobile communication device, such as a land line, the call would be directly routed to the public network at block 3. Either call avenue is routed to a termination point at the auto switch board service (IVR) at block 4 where the phone identification (phone number or caller ID) is captured. Also at block 4, the auto switch board services, such as Ring Central, provide one or more selection prompts for the caller to select from during the telephone call. The selection is captured at block 5 and the call is terminated at block 7 if a valid selection decision is entered by the caller at decision block 6. The system then identifies which option the caller selected 8a (opt-in Option), 8b (opt out option), 8c (customer support) or 8d (other option), or possibly more or less selection. If the system identifies either option 8a or 8b then the ten digit phone identification is received at the voice opt service site at block 9 from the switch board. The carrier type and information is requested at block 10 from the SMS gateway at block 12. The received carrier type and information is received at block 12 from the SMS gateway. The carrier type and information is then evaluated at block 13 to determine whether it is a mobile communication device. If the call is not from a mobile communication device, the ten digit phone identification is saved on the server on an "exception list" at block 14 for a personal follow up at a later time. If the selection captured was to "opt in" at block 15, an opt in message is sent via the SMS gateway to the phone identification previously captured. If the selection captured was to resign membership (or opt out), an opt out message is sent via the SMS gateway to the phone identification previously captured. If the selection captured was customer support, then the caller is requested to leave a voice mail message identifying their name, problem and cellular number at block 17 so that a representative may resolve the problem and return the call. The message is saved on the server for future resolution at block 18 and then the call is terminated at block 19. If any other support option is selected then other support avenues are exercised at block 20. If the keypad input at block 5 is not recognized at block 6, then the call is returned to the auto switch board service at block 4 for re-retrieval of the service selection.

Figure 5:
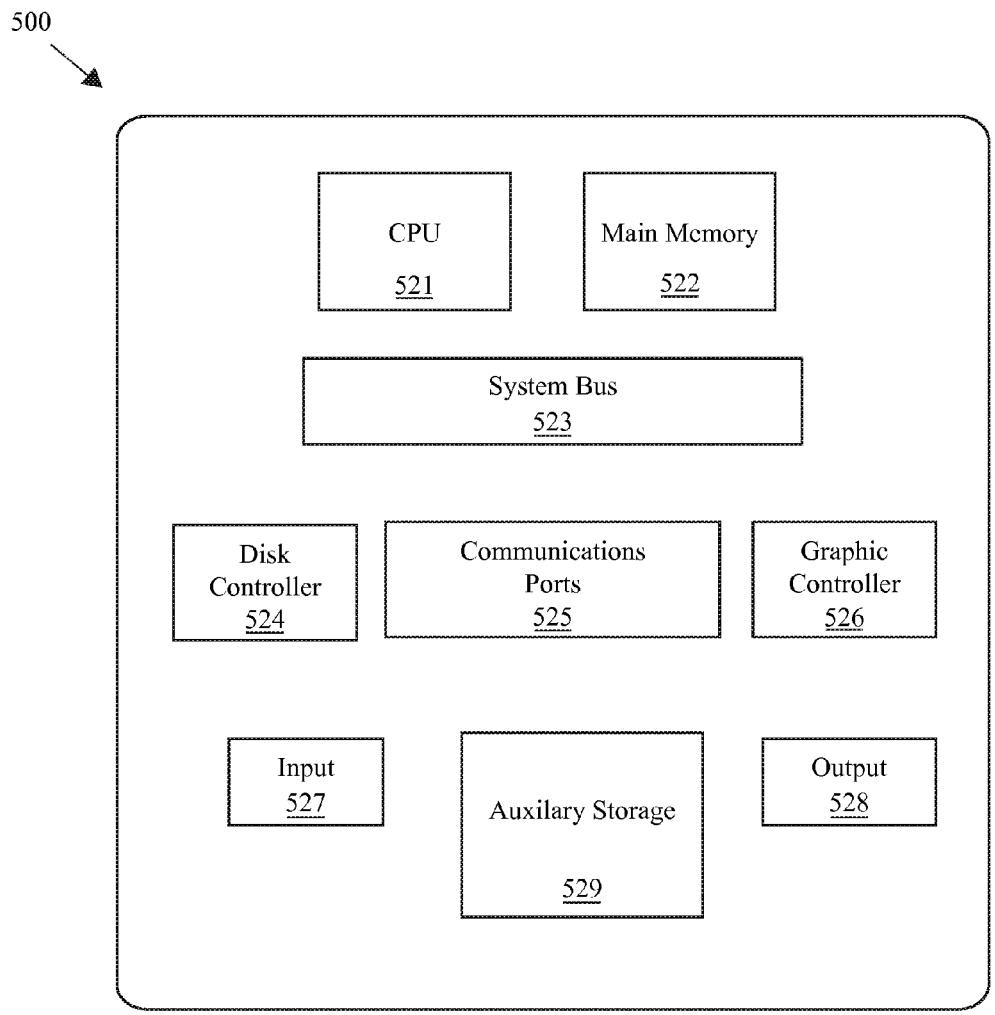
FIG. 5 is block diagram of a server utilized for a method or system for mobile voice calls to mobile terminated data.

FIG. 5 is a block diagram of a preferred server 500 utilized with the method and system of the present invention. The server preferably comprises a CPU 521, a main memory 522, a system bus 523, a disk controller 524, multiple communication ports 525, a graphic controller 526, an input 527, an auxiliary storage 529 and an output 528. Those skilled in the pertinent art will recognize that other components may be present in a server without departing from the scope and spirit on the present invention.

Figure 6:
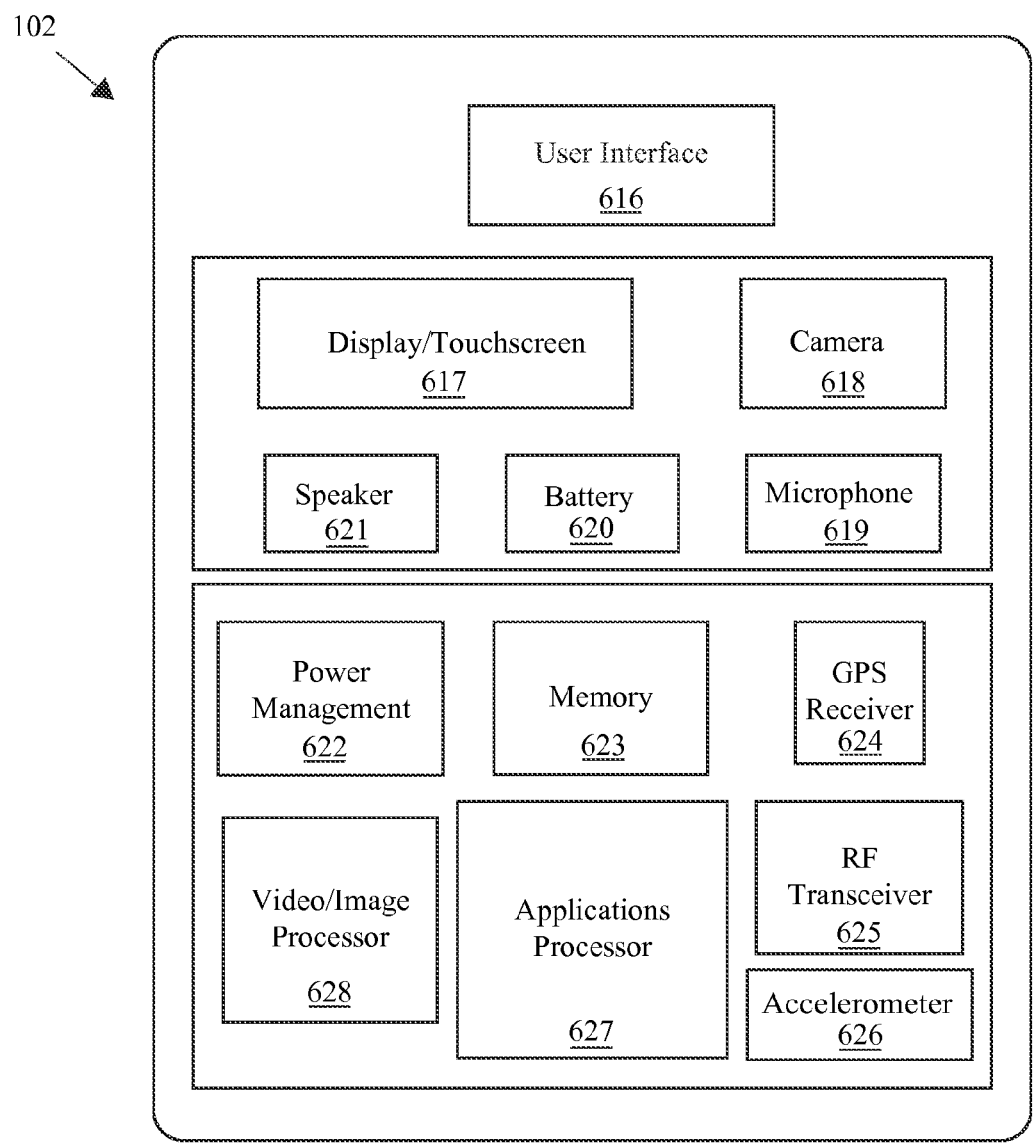
FIG. 6 is block diagram of a mobile communication device utilized for a method or system for mobile voice calls to mobile terminated data.

FIG. 6 is a block diagram of a preferred mobile communication device 102 utilized with the method and system of the present invention. The mobile communication device 102 preferably comprises a user interface 616, a touchscreen 617, a camera 618, a microphone 619, a battery 620, a speaker 621, a power management component 622, a memory 623, a GPS receiver 624, a RF transceiver 625, an accelerometer 626, an applications processor 627 and a video/image processor 628. Those skilled in the pertinent art will recognize that other components may be present in a mobile communication device without departing from the scope and spirit on the present invention.

Figure 7:
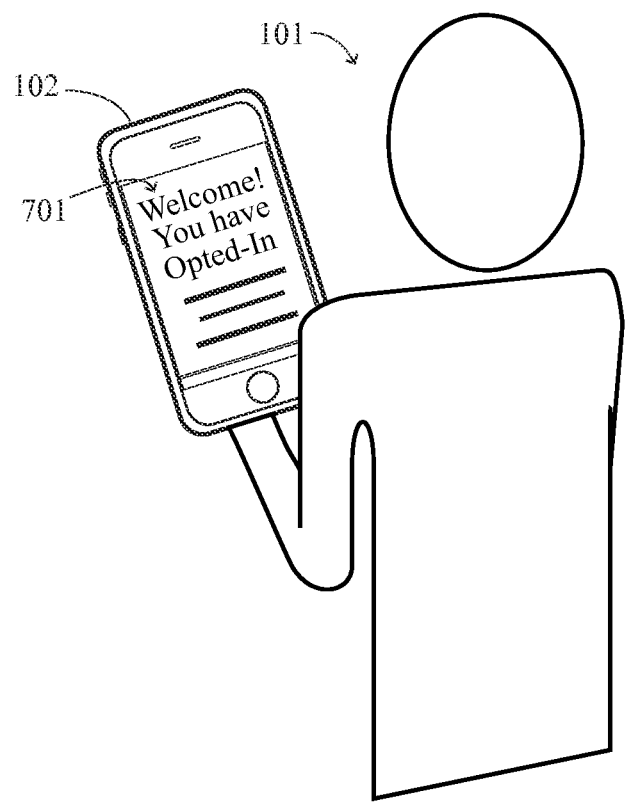
FIG. 7 is an illustration of a user receiving an opt-in confirmation message on a mobile communication device.

FIG. 7 is an illustration of an end user 101 receiving an opt-in confirmation message 701 on a display screen of a mobile communication device 102 after the end user has called the ten digit telephone number for opting in to receive digital communications from an enterprise. The end user 101 only had to place the call to the ten digit telephone number using the mobile communication device 102 and make a single selection. Thus, the end user 101 did not have to wait for the processing to verify the opt-in selection.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for a user to opt-in to receive digital communications, the method comprising:
   receiving a telephone call to a pre-designated telephone number from a telephone number of a user;
   collecting the caller identification of the telephone number of the user at a voice call termination point;
   receiving a valid selection from the telephone number of the user and the telephone call at a voice termination point;
   determining a type and a phone carrier of the telephone number of the user subsequent to terminating the call subsequent to ending the call;
   screening the telephone number of the user for association with a data capable phone carrier and communication device subsequent to ending the call;
   determining that the telephone number of the user is associated with a data capable phone carrier and communication device subsequent to ending the call; and
   transmitting a confirmation digital communication from a voice opt service site to the data capable communication device associated with the telephone number of the user, the confirmation digital communication transmitted subsequent to the ending of the call;
   determining at least one of: the on/off status of the mobile communication device; the type of mobile communication device; an SMS plan associated with the mobile communication device; and a data plan associated with the mobile communication device;
   transmitting to the mobile communication device appropriate content based on at least one of a mobile communication service provider, the type of mobile communication device, the SMS plan associated with the mobile communication device, and the structure of the data plan associated with the mobile communication device;
   wherein the user does not wait on the telephone call after the telephone call is ended.

2. The method according to claim 1 wherein the digital communication is a MMS communication.

3. The method according to claim 1 wherein the digital communication is a SMS communication.

4. The method according to claim 1 wherein the digital communication is a content push.

5. The method according to claim 1 wherein the digital communication is a WAP push.

6. The method according to claim 1 wherein the data capable communication device is a mobile phone.

7. The method according to claim 1 wherein the digital communication is a confirmation to participate in a mobile marketing campaign.

8. A method for a Mobile Marketing Association compliant opt-in to a mobile marketing campaign, the method comprising:
   receiving a telephone call to a pre-designated telephone number from a telephone number of a user;
   transferring the telephone call from the mobile communication device to a mobile service provider;
   transferring the telephone call from the mobile service provider to a public network;
   transferring the telephone call from the public network to a voice call termination point;
   collecting the caller identification of the mobile communication device at the voice call termination point;
   confirming that an opt-in option has been selected; ending the telephone call;

storing the caller identification of the mobile communication device at a voice opt service site subsequent to ending the telephone call;

requesting a carrier type and information for the mobile communication device from a SMS gateway subsequent to ending the call;

receiving the carrier type and information for the mobile communication device from the SMS gateway at the voice opt service site subsequent to ending the call;

confirming at the voice opt service site that the call is from a mobile communication device subsequent to ending the call;

transmitting an opt-in confirmation message from the voice opt service site to the mobile service provider subsequent to ending the telephone call; and transmitting the opt-in confirmation message from the mobile service provider to the mobile communication device subsequent to ending the call;

wherein the user does not wait on the telephone call after the telephone call is ended;

transmitting an opt-in confirmation message from the voice opt service site to the mobile service provider subsequent to ending the telephone call; and transmitting the opt-in confirmation message from the mobile service provider to the mobile communication device subsequent to ending the call;

determining at least one of: the on/off status of the mobile communication device; the type of mobile communication device; an SMS plan associated with the mobile communication device; and a data plan associated with the mobile communication device;

transmitting to the mobile communication device appropriate content based on at least one of a mobile communication service provider, the type of mobile communication device, the SMS plan associated with the mobile communication device, and the structure of the data plan associated with the mobile communication device;

wherein the user does not wait on the telephone call after the telephone call is ended.

9. The method according to claim 8 wherein the opt-in confirmation message is a MMS communication.

10. The method according to claim 8 wherein the opt-in confirmation message is a SMS communication.

11. The method according to claim 8 wherein the data capable communication device is a mobile phone.

12. A system for a user to opt-in to receive digital communications, the system comprising:

a communication network;

a plurality of mobile communication devices capable of accessing the communication network;

a voice opt service site in communication with at least one of the plurality of mobile communication devices over the communication network, the voice opt service site configured to receive a telephone call to a pre-designated telephone number from a telephone number of a user, to collect the caller identification of the telephone number of the user, to confirm that an opt-in option has been selected, to end the telephone call, to determine a type and a phone carrier of the telephone number of the user after the telephone call has ended, to screen the telephone number of the user for association with a data capable phone carrier and communication device after the telephone call has ended, to determine that the telephone number of the user is associated with a data capable phone carrier and communication device after the telephone call has ended, to transmit a confirmation digital communication from a voice opt service site to the data capable communication device associated with the telephone number of the user after the telephone call has ended, to determine at least one of: the on/off status of the mobile communication device; the type of mobile communication device; an SMS plan associated with the mobile communication device; and a data plan associated with the mobile communication device; and to transmit to the mobile communication device appropriate content based on at least one of a mobile communication service provider, the type of mobile communication device, the SMS plan associated with the mobile communication device, and the structure of the data plan associated with the mobile communication device;

wherein the user does not wait on the telephone call after the telephone call is ended.

13. The system according to claim 12 wherein the digital communication is a confirmation to participate in a mobile marketing campaign.

14. The system according to claim 12 wherein the digital communication is a MMS communication.

15. The system according to claim 12 wherein the digital communication is a SMS communication.

16. The system according to claim 12 wherein at least one of the plurality of mobile communication devices is a mobile phone.

* * * * *